(12) United States Patent
Jain et al.

(10) Patent No.: US 8,090,974 B1
(45) Date of Patent: Jan. 3, 2012

(54) STATE MACHINE CONTROLLED DYNAMIC DISTRIBUTED COMPUTING

(75) Inventors: Parveen Jain, San Jose, CA (US); Satya Ramachandran, Fremont, CA (US); Sushil Thomas, San Francisco, CA (US); Anupam Singh, San Jose, CA (US)

(73) Assignee: Joviandata, Inc., San Jose, CA (US)

( * ) Notice: Subject to any disclaimer, the term of this patent is extended or adjusted under 35 U.S.C. 154(b) by 238 days.

(21) Appl. No.: 12/366,958

(22) Filed: Feb. 6, 2009

Related U.S. Application Data

(60) Provisional application No. 61/027,357, filed on Feb. 8, 2008.

(51) Int. Cl.
  *G06F 11/00* (2006.01)
(52) U.S. Cl. ............ 714/3; 714/39; 714/21; 714/38.13; 714/47.2
(58) Field of Classification Search ............... 714/3, 39, 714/21, 38.13, 47.2, 49
  See application file for complete search history.

(56) References Cited

U.S. PATENT DOCUMENTS

| | | | |
|---|---|---|---|
| 2003/0233600 A1* | 12/2003 | Hartman et al. | 714/32 |
| 2004/0215848 A1* | 10/2004 | Craddock et al. | 710/39 |
| 2008/0126148 A1* | 5/2008 | Buco et al. | 705/7 |
| 2009/0006527 A1* | 1/2009 | Gingell et al. | 709/202 |

OTHER PUBLICATIONS

Graefe, "Query Evaluation Techniques for Large Databases", ACM Computing Surveys, vol. 25(2):73-170, Jun. 1993.
Fox et al., "Harvest, Yield, and Scalable Tolerant Systems", Proceedings of the Seventh Workshop on Hot Topics in Operating Systems, 8 pages, 1999.
Selinger, Proceedings of the 19th VLDB Conference, Dublin, Ireland, 9 pages, 1993.

* cited by examiner

*Primary Examiner* — Scott Baderman
*Assistant Examiner* — Sarai Butler
(74) *Attorney, Agent, or Firm* — Perkins Coie LLP

(57) ABSTRACT

A computer readable storage medium with executable instructions specifies the execution of a state machine operating across a set of computing nodes in a distributed computing system. The executable instructions execute a set of operators, where the execution of each operator is under the control of a state machine that periodically invokes pause control states to pause the execution of an operator in response to a violation of a service level agreement specifying an operating condition threshold within the distributed computing system. Partitions of input data are formed that are worked on independently within the distributed computing system. A set of data batches associated with the input data is processed. Data partition control states to process the partitions associated with the set of data batches are specified. Key control states to process a set of keys associated with a data partition of the partitions are defined.

20 Claims, 12 Drawing Sheets

STATE MACHINE CONTROLLED DYNAMIC DISTRIBUTED COMPUTING

CROSS-REFERENCE TO RELATED APPLICATION

This application claims priority to U.S. Provisional Patent Application Ser. No. 61/027,357, filed Feb. 8, 2008, entitled "Apparatus and Method for Large Scale Distributed Query Processing with Dynamic Data Operators, Task Processing and Tuple Routing", the contents of which are incorporated herein by reference.

This application is related to the concurrently filed and commonly owned patent application entitled "System for Pause and Play Dynamic Distributed Computing", filed Feb. 6, 2009, Ser. No. 12/366,937.

FIELD OF THE INVENTION

This invention relates generally to distributed computing. More particularly, this invention relates to discontinuous operator execution and dynamic resource allocation in a distributed computing environment.

BACKGROUND OF THE INVENTION

In the context of this document, distributed computing refers to hardware and software systems containing multiple processing elements and concurrent processes running under loose control. In particular, in distributed computing, a program is split into parts that run simultaneously on multiple computers communicating over a network. In contrast, parallel computing involves simultaneously running program segments on multiple processors of a single machine. Distributed computing must address heterogeneous environments, network links of varying latencies and unpredictable failures within the network of computers.

A query processing task to be performed in a distributed environment is split into operators. An operator is a unit of work to complete a sub-task associated with the task. The unit of work may be an operational code (opcode) or set of opcodes. An opcode is the portion of a machine language instruction that specifies an operation to be performed. The specification and format of an operator are defined by the instruction set architecture of the underlying processor. A collection of operators forms a data processing operation that executes in a pipelined fashion. An operator works on objects. As used herein, an object refers to operands or data that are processed by an operator. In a distributed computing environment, objects are commonly processed as batches, partitions, keys and rows. A batch is a large collection of data. Partitions define the division of data within a batch. Keys correlate a set of data within a partition. Each key has an associated set of data, typically in one or more rows or tuples.

Existing distributed computing systems execute query processing tasks in accordance with a static set of resources and a static sequence of operator execution. FIG. 1 illustrates a distributed computing workflow utilized in accordance with the prior art. A daily statistics collector 1 produces statistics regarding source data (e.g., tables) in the distributed computing environment. This results in data distribution statistics 2. A parser 3 parses a query (e.g., a task) to be computed in the distributed computing environment. The parsed or divided query is then processed by a compiler 4. The compiler divides the task into operators. This operation relies upon the data distribution statistics 2 and execution statistics. In particular, the compiler uses sophisticated compilation strategies to generate the best distributed processing resource utilization plan for the operators. The operators are then executed 5. Execution statistics are then generated and stored.

The technique illustrated in FIG. 1 relies upon data distribution statistics characterizing past operation of the distributed computing environment. In other words, the execution plan does not rely upon the current state of the distributed computing environment. The execution plan also relies upon a static resource allocation based upon past network performance. In addition, a static order of operator execution is utilized. The static nature of this approach does not accommodate existing situations in the distributed computing environment.

The preceding paragraph discussed query processing in particular because query processing has the most formal model of execution. However, the problem of static resource allocation applies to distributed programs in general.

It would be desirable to execute tasks in a distributed computing environment in a manner that addresses the existing state of the environment. More particularly, it would be desirable to dynamically allocate resources in a distributed computing environment in response to discontinuous operator execution that surveys existing conditions in a distributed computing environment.

SUMMARY OF THE INVENTION

A computer readable storage medium with executable instructions specifies the execution of a state machine operating across a set of computing nodes in a distributed computing system. The executable instructions execute a set of operators, where the execution of each operator is under the control of a state machine that periodically invokes pause control states to pause the execution of an operator in response to a violation of a service level agreement specifying an operating condition threshold within the distributed computing system. Partitions of input data are formed that are worked on independently within the distributed computing system. A set of data batches associated with the input data is processed. Data partition control states to process the partitions associated with the set of data batches are specified. Key control states to process a set of keys associated with a data partition of the partitions are defined.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
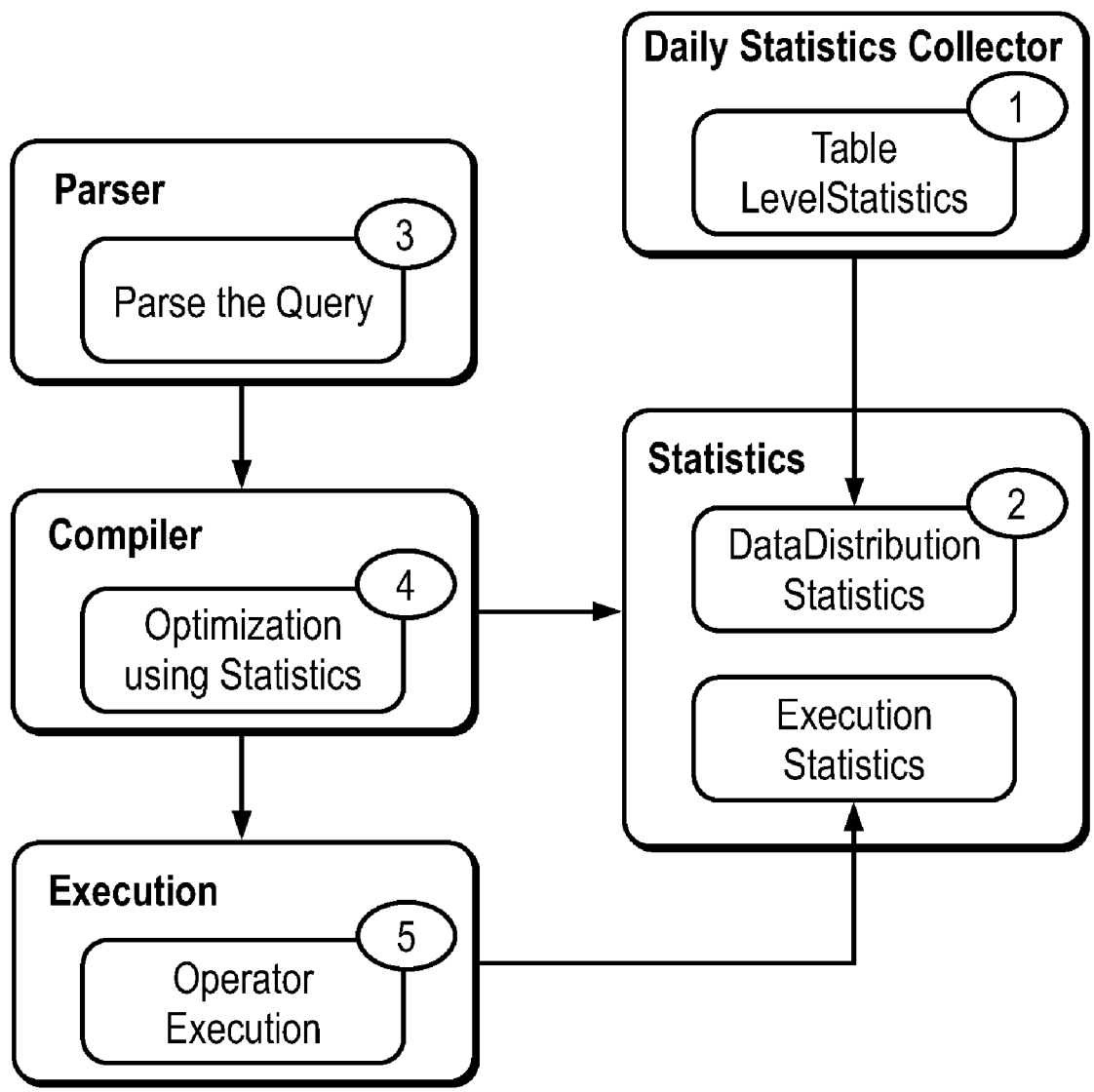
FIG. 1 illustrates prior art processing operations in a distributed computing environment.
Figure 2:
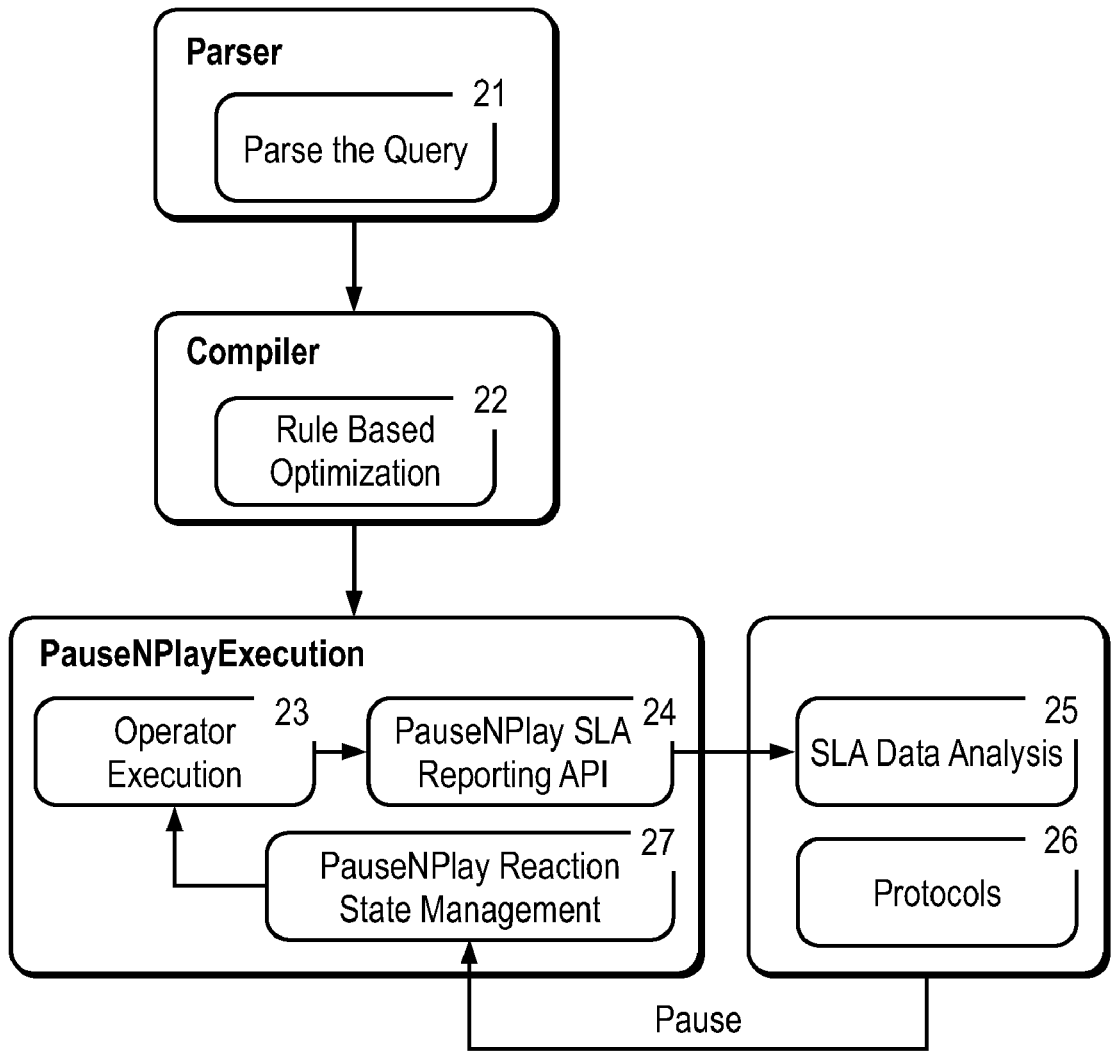
FIG. 2 illustrates distributed computing environment processing operations performed in accordance with an embodiment of the invention.

FIG. 2 illustrates distributed computing environment processing operations performed in accordance with an embodiment of the invention. A parser 21 parses a query for validation. This operation may be implemented in accordance with prior art techniques. Next, a compiler 22 uses static rules to generate an evaluation plan. The operators generated by the compiler utilize a pause and play Application Program Interface (API) to support operations of the invention. In other words, the compiler augments an operator with pause and play API method calls to implement operations of the invention. As discussed below, the pause and play API implements discontinuous operator execution to account for system resources. Based upon dynamic system conditions, operator execution may be paused and resources may be dynamically allocated. In conventional systems, such as the system of FIG. 1, once operators start executing, there is no structured framework to react to system state changes. The state changes might be due to resource starvation or data distribution skews. Execution of a static plan does not account for resource perturbation during the lifetime of an operator. The pause and play operator API avoids this optimistic and blind execution of operators.

While the pause and play operations of the invention introduce some delay, the delay is minor in the context of the long-running operators the system executes, and the total execution time of a job is typically reduced through opportunistic dynamic resource allocation. This is the case because the distributed computing environment is processing large tasks and large volumes of data.

The next operation of FIG. 2 is operator execution 23. This operation may be invoked by an API call to play or execute an operator. During execution, additional API calls associated with the operator provide Service Level Agreement (SLA) reports 24. A Service Level Agreement (SLA) of the invention specifies a set of operating condition thresholds within the distributed computing environment. These operating condition thresholds may be based upon customer requirements and/or expected behavior in the distributed computing environment. For example, an SLA may specify that an operator must access a computing resource in a predetermined period of time. Alternately, an SLA may specify that an operator must complete execution in a predetermined period of time. Another SLA may be configured to identify skew in operator execution on different partitions. Violations of SLAs are reported to an SLA data analysis module 25 via a reporting API.

The execution of the operator of the invention is not continuous. Rather it is under the control of a state machine accessed through the API. The state machine waits for triggering events to proceed with processing, as discussed below.

Any operator that implements pause and play operations of the invention executes in a paranoid world. Instead of blind optimism, it continuously checks with the SLA data analysis module 25 for any changes to its execution plan. In essence, it does not assume a continuously stable resource map. The sequence of SLA data analysis checks and reactions are non-trivial since they have to be executed in the right points in the lifetime of the operator. If done at random times, these checks will lead to physical and logical inconsistencies. The state machine organizes various states of the pause and play operation. The state machine guarantees correct results even if the operator has to adapt to changes in the data distribution and resource map.

The SLA data analysis module 25 is a form of back office for pause and play operators of the invention. As the operators continuously report their current characteristics to the back office, it collects all the data and analyzes it alongside data from other operators. After this analysis, if a specific operator is in violation of pre-set SLAs, the operator is paused to execute an adaptability action. Thus, the SLA data analysis module 25 independently and asynchronously analyzes system wide information to impose SLAs for pause and play operators.

Based upon an analysis of an operator's SLA reports, adaptability instructions are sent to operators in accordance with protocols 26. The protocols react to reports from the SLA data analysis module 25 and issue instructions back to an executing operator. In particular, the protocols interface with the state machines associated with operators. The protocols marry the adaptive actions specified by the SLA data analysis module 25 with the states in the pause and play API. Thus, as shown in FIG. 2, pause and play reaction state management 27 may pause operator execution.

The processing operations of FIG. 2 are typically deployed on various nodes of a distributed computing environment. For example, a parser 21 may be on one node, a compiler 22 may be on another node, a pause and play execution module may be on another node, while the SLA data analysis module 25 is on still another node. Modules may be combined on given nodes or may be fully distributed. It is the operations of the invention that are significant, not the precise manner or location of operation execution.

As previously indicated, most data processing query compilers generate operator plans based upon some prior data, such as statistics or access paths. Based upon this information, the operators have a static order of execution as well as near static resource allocation. Any mistakes made during compilation are not corrected during execution. At most, there are attempts to learn from previous mistakes after execution and correct those mistakes with subsequent query processing. The invention redefines operators to implement in-flight correction and adaptability. With the invention, there is no static access path, no pre-set resource map and no static location in the cluster. The operator implements a series of states that allows it to adapt to a universe of transient resources.

Figure 3:
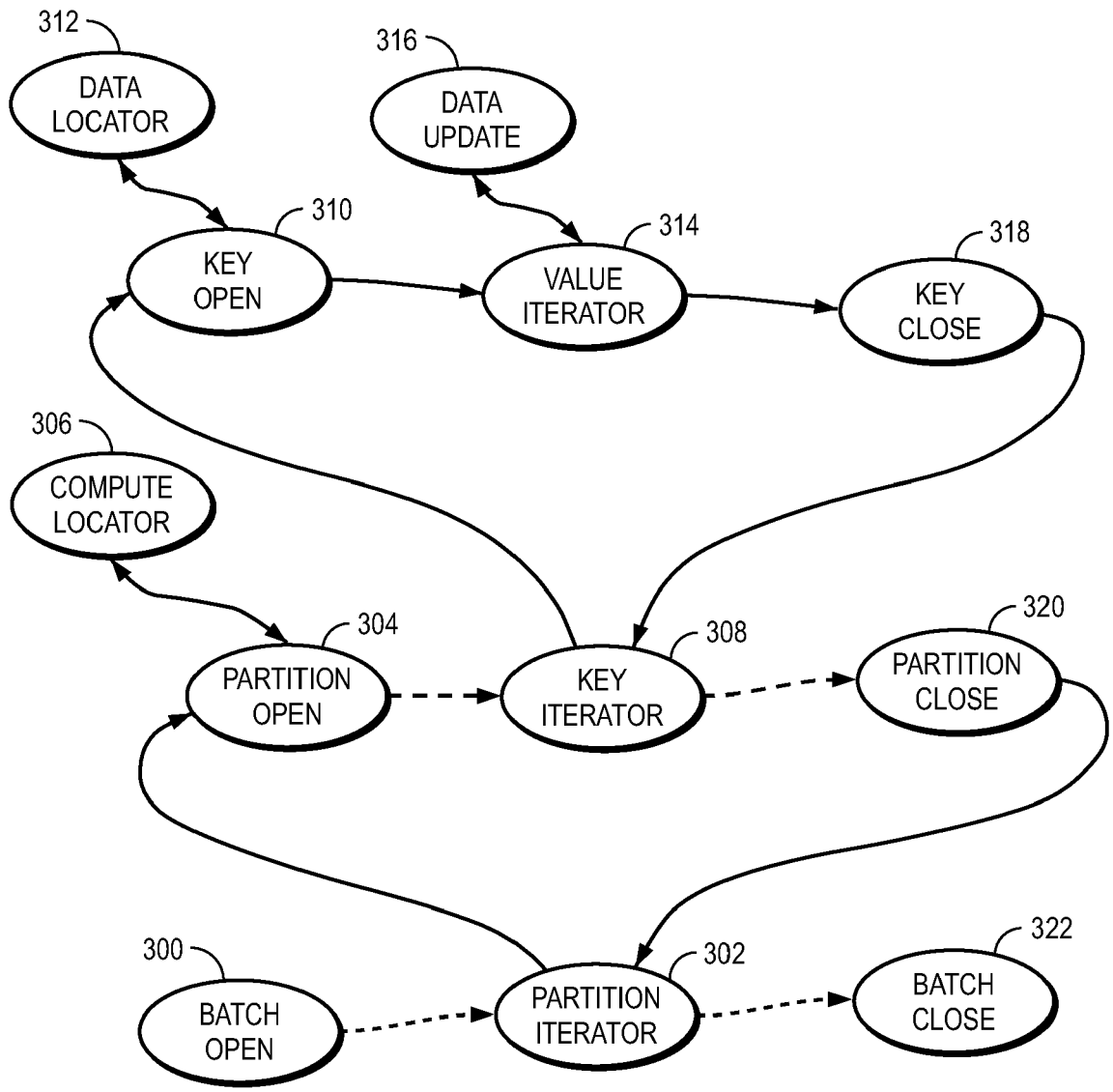
FIG. 3 illustrates a prior art state machine for processing data batches, data partitions and keys in a distributed environment.

FIG. 3 illustrates a conventional state machine to control operations in a distributed computing environment. A batch of data is initially opened 300. Each partition in the batch is then processed through a partition iterator 302. Each cycle of the partition iterator 302 includes an operation to open a partition 304. A computation locator 306 is associated with the partition open state 304. Once a partition is opened, keys in the partition are processed via a key iterator 308. Each cycle of the key iterator 308 involves opening a key 310 in conjunction with a data locator 312. Values within the key are then processed via the value iterator 314, which receives data updates 316. Then, a key is closed 318 and additional keys are processed. Once all keys are processed, a partition is closed 320. The next partition is then processed via the partition iterator 302. Once all partitions are processed, the batch is closed 322.

It should be appreciated that the operations of FIG. 3 are performed among many nodes (processing resources) within a distributed computing environment. The state transitions forming the state machine of FIG. 3 may be implemented as different processing modules on different nodes. For example, the batch open state 300 may be a module of executable instructions performed on a first node, while the partition iterator state 302 may be another module of executable instructions performed on a second node. Control of state transitions may be implemented in the different modules or a separate module (not shown). It should be noted that once a batch is opened, partitions within a batch can be processed concurrently. Similarly, once a partition is opened, keys within a partition can be processed concurrently.

The problem with the system of FIG. 3 is that if there are too many values for a specific batch, partition or key, then processing can be severely degraded. In addition, some resources can get flooded during operator execution. This leads to operators running for extended periods of time and then possibly failing in the midst of processing data. For a complex operator, conventional systems need to discard work and restart processing for the entire batch of data. Finally, for operators that take hours or longer to run, execution on a large distributed system increases the possibility of physical failures during operation execution. In this case, restarting from scratch is a very prohibitive operation both because of the cost of rolling back any work that was done up to the point of failure, and because of the cost of re-running the operator.

The invention addresses these problems by making no assumption about a resource's (CPU, disk, network, memory) characteristics or the behavior of data (distribution, skew). Instead, the invention relies upon execution visibility. Execution dynamics are analyzed throughout the processing of an operator. For example, every action by the operator on behalf of a batch, partition or key may be reported back to the data analysis module 25. This may be thought of as adding state conditions to the processing of FIG. 3.

Figure 4:
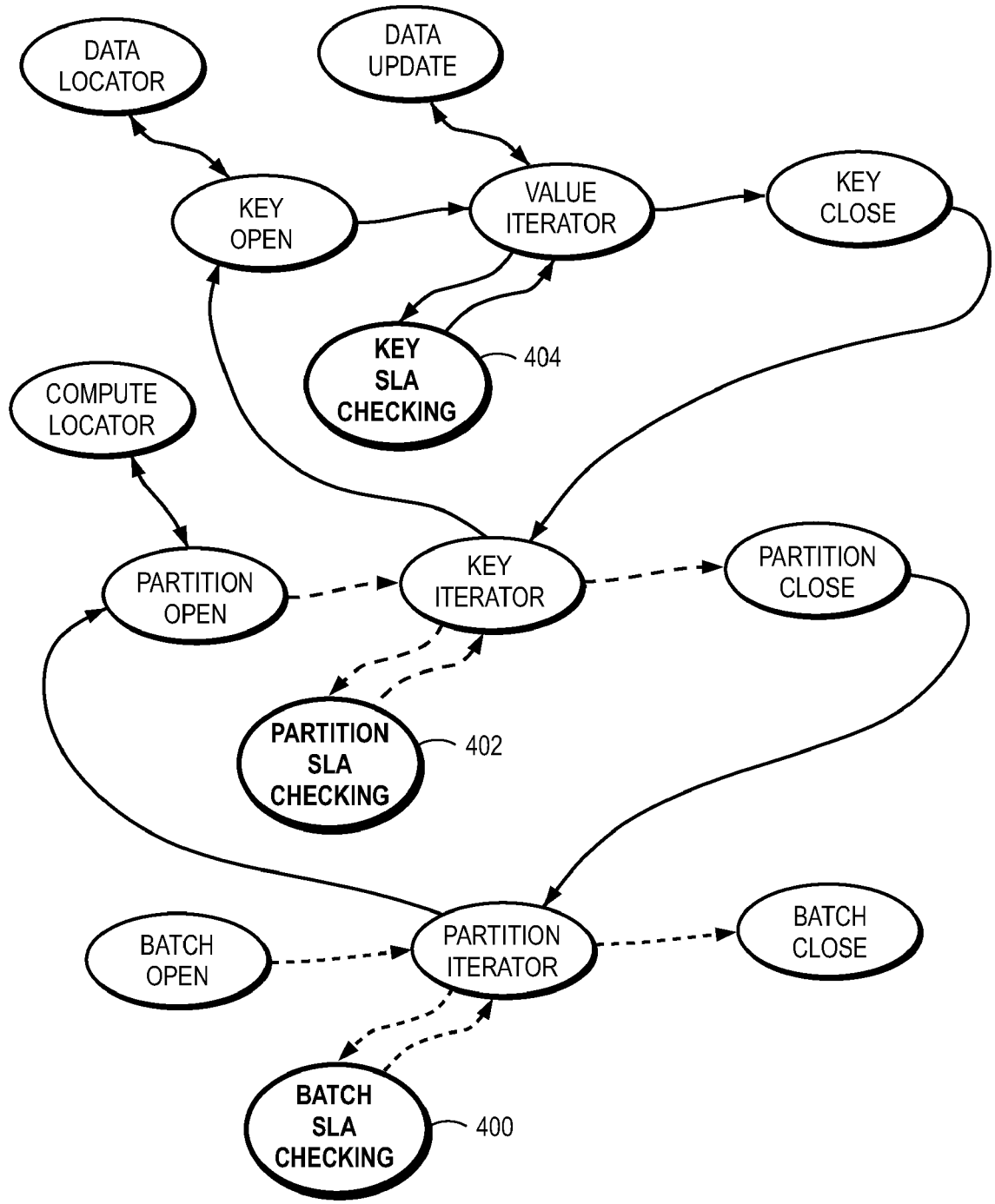
FIG. 4 illustrates batch, partition and key service level agreement check states utilized in accordance with an embodiment of the invention.

FIG. 4 illustrates the state diagram of FIG. 3 supplemented with additional state. The additional state provides SLA visibility. In particular, batch SLA checking 400 is added. The batch SLA checking 400 checks service level agreements related to the operation of a batch. Violations of such agreements are routed to the data analysis module 25. Similarly, partition SLA checking 402 is added. This state operates to check service level agreements related to the operation of a partition. Violations are routed to the data analysis module 25. Key SLA checking 404 operates in the same manner, but in connection with key processing.

Figure 5:
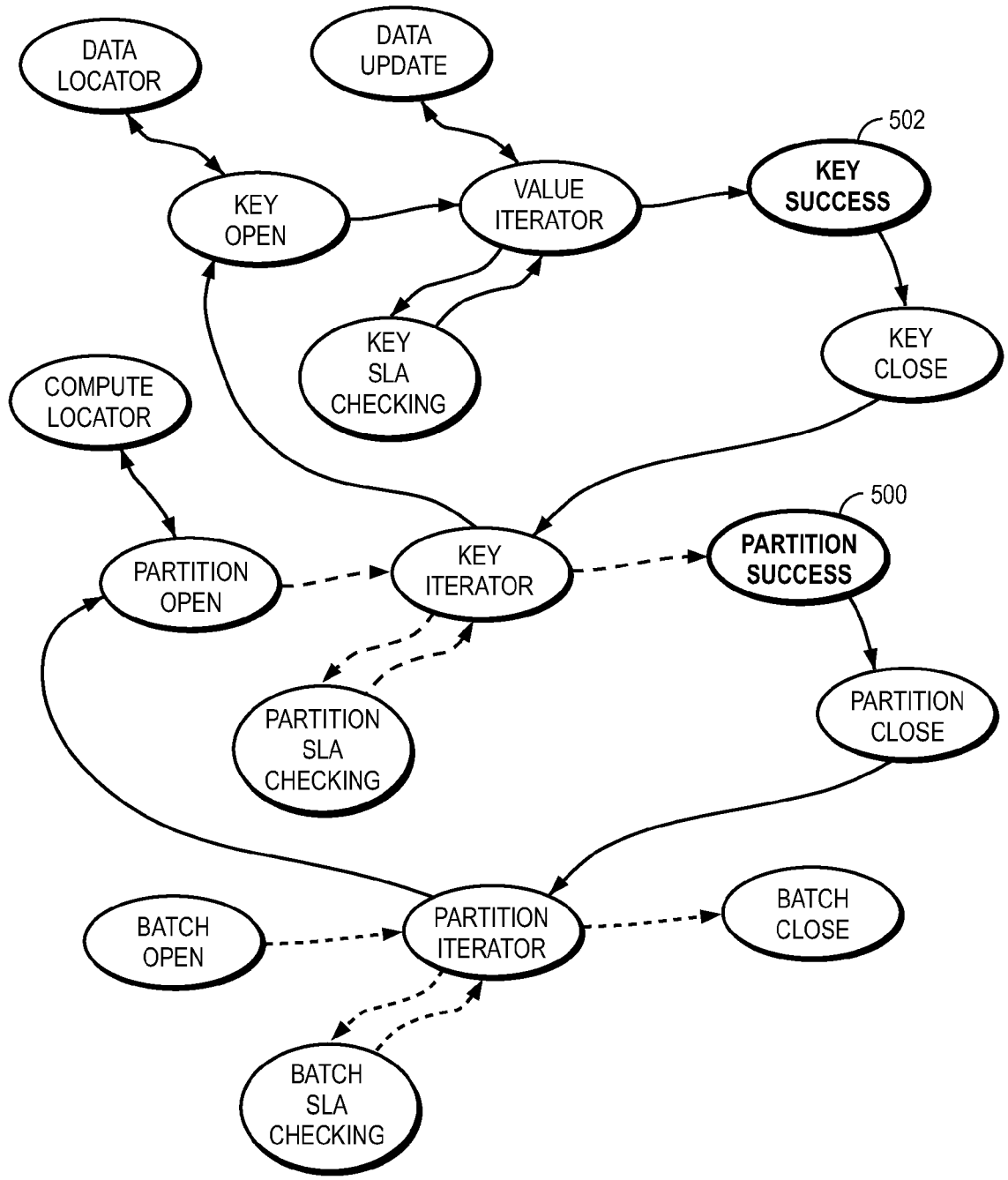
FIG. 5 illustrates key success and partition success check states utilized in accordance with an embodiment of the invention.

As previously indicated, the invention is implemented to assume various data distribution skews and resource disruptions in the distributed computing environment. Therefore, it is desirable to record partial progress in the execution of an operator. This partial progress represents success indicators. FIG. 5 illustrates the state machine of FIG. 4, but with additional states of partition success 500 and key success 502. In this embodiment, to prepare for unforeseen events, the operator logs the successful completion of a partition and a key. In particular, the boundaries for status logging are defined as the closing point of each key and each partition. The successful completion of a specific batch, partition and key is used by the data analysis module 25 during restart processing in the event of an adaptability cycle. In particular, the stored state is used to recommence operator processing from the point of paused processing.

Figure 6:
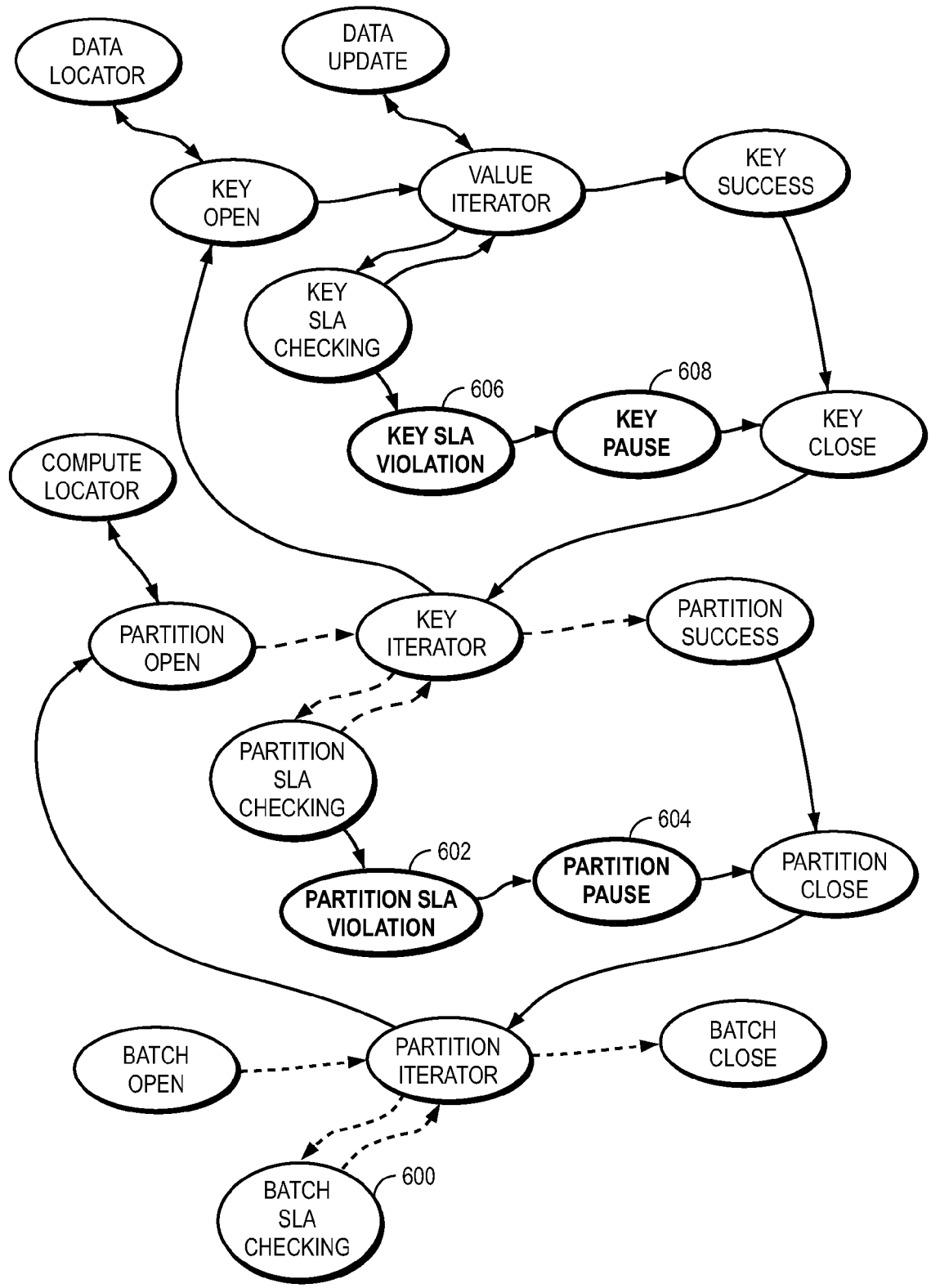
FIG. 6 illustrates batch, partition and key service level agreement violation state checks and partition and key pause states utilized in accordance with an embodiment of the invention.

FIG. 6 illustrates the state machine of FIG. 5 supplemented to include additional state to support the pausing of an operator, sometimes referred to herein as graceful pause. When an SLA violation occurs, the batch, partition or key will voluntarily interrupt or pause its processing. This pause is graceful because the operator has time to reach a logical boundary before interrupting its own processing. Due to the voluntary nature of the pause, no controller intervention is needed. At the pause, the operator's iterators will skip a specific batch, partition or key. To facilitate partial replay of the batch, partition or key, the status of the specific batch, partition or key is marked as unfinished.

FIG. 6 illustrates batch SLA checking 600. A violation identified by partition SLA checking 602 results in a partition pause 604. Similarly, a key SLA violation results in a key pause 608. When a batch, partition or key is skipped due to an SLA violation, it is restarted by the data analysis module 25. An entire batch is scheduled, but only the batch, partition or key that were skipped will be replayed. In other words, the stored state is relied upon for past processing results prior to the point of pause and replay.

Figure 7:
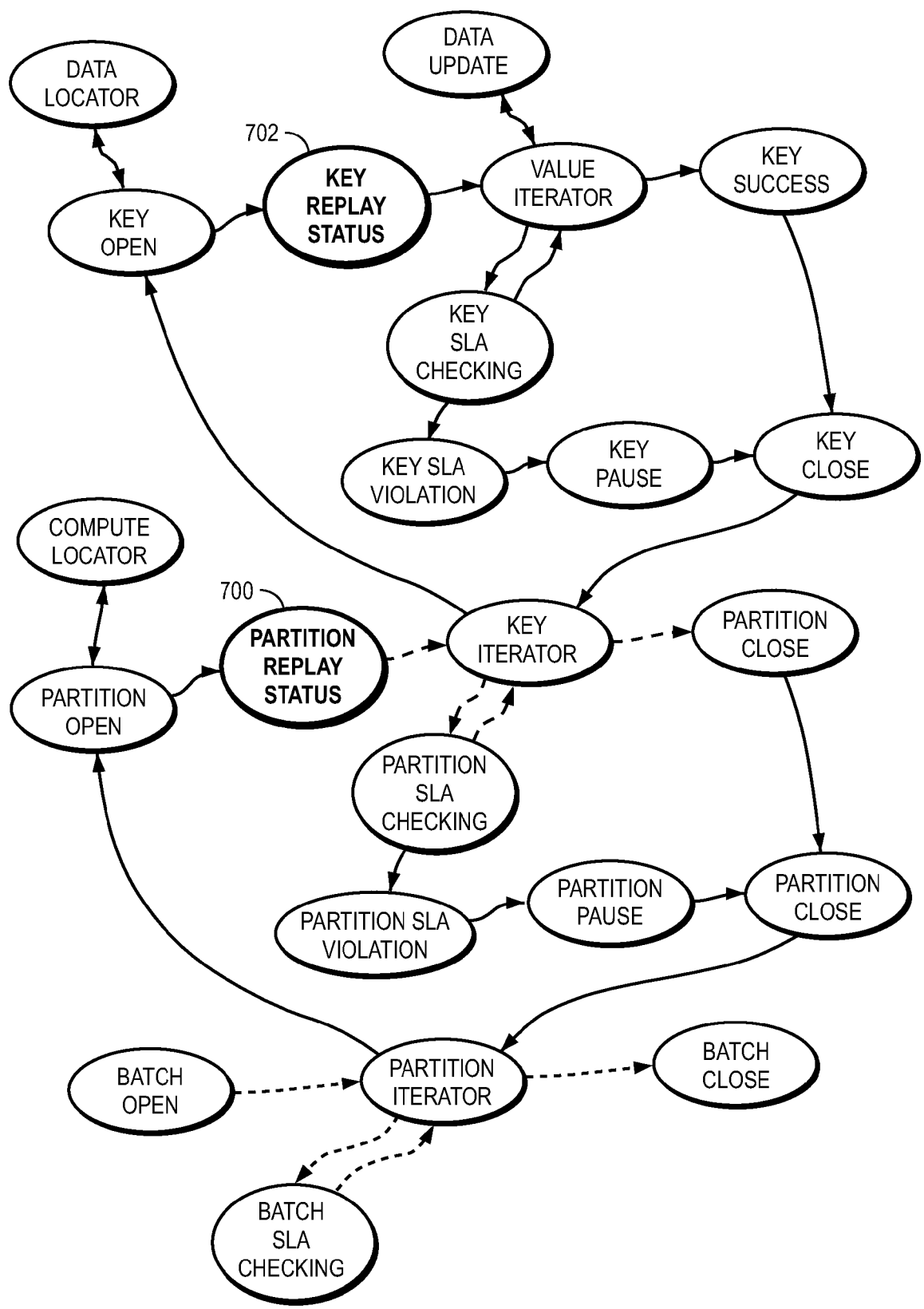
FIG. 7 illustrates partition and key replay status statues utilized in accordance with an embodiment of the invention.

Since an operator can be invoked many times for the same data, the operator may need to first verify whether it has seen a particular data item. Therefore, a replay status state is introduced. For example, FIG. 7 illustrates partition replay status 700 and key replay status 702. In this state, the operator first checks the status of a given key within the context of a particular batch and partition. Similarly, for a partition, the operator checks the status of a partition before processing it. If the partition or key has already been processed, it will not be processed at all and the iterators will move to the next partition or key, respectively. If the partition or key has been processed partially, the operator will execute for the remainder of the data. This represents partial re-play.

Figure 8:
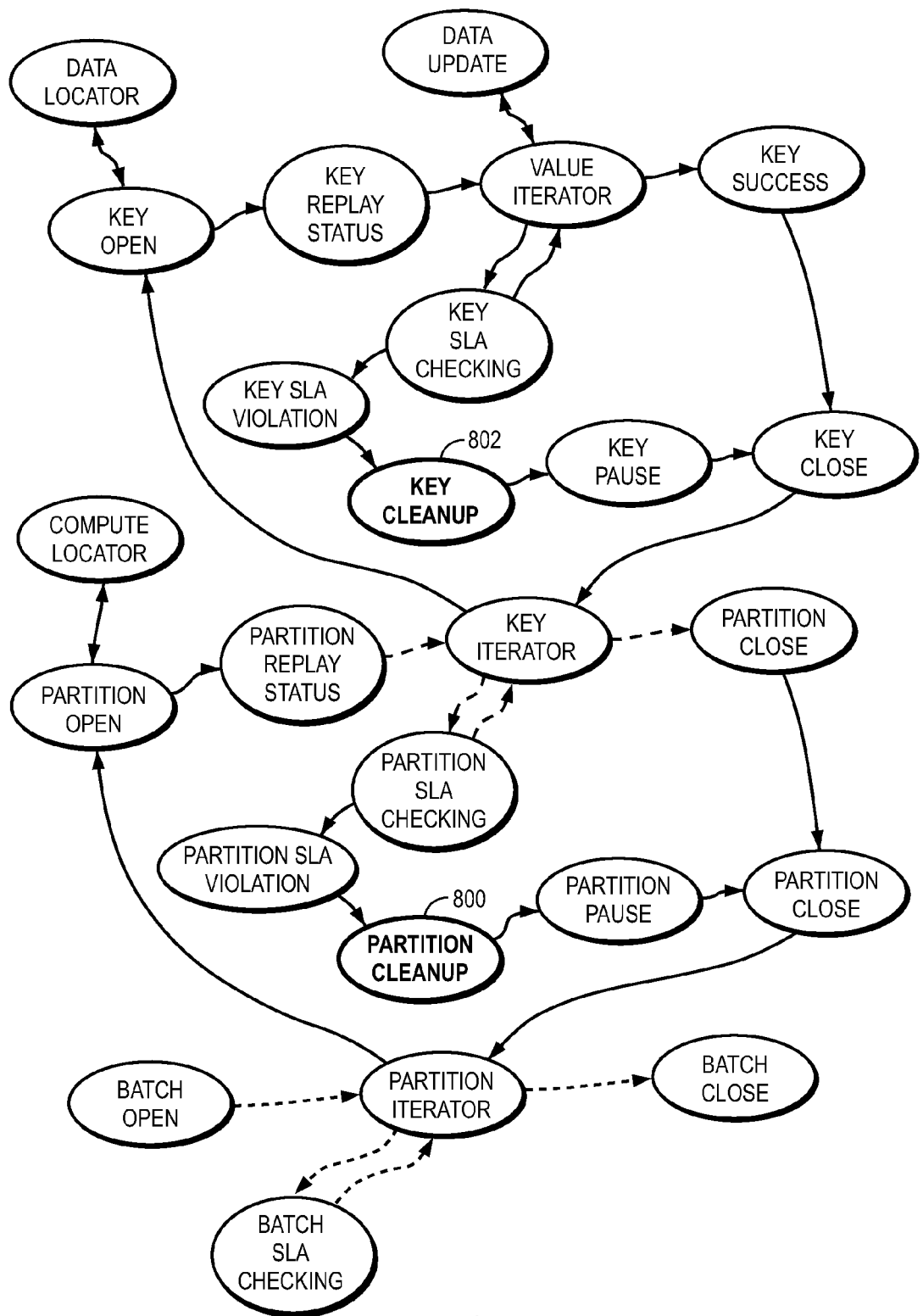
FIG. 8 illustrates partition and key cleanup states utilized in accordance with an embodiment of the invention.

FIG. 8 illustrates the state diagram of FIG. 7, but with the addition of a partition cleanup state 800 and a key cleanup state 802 to support fidelity across re-play. The operator goes into these states when it voluntarily detects an SLA violation. Once an SLA violation is detected, the intermediate data for that batch or partition is cleaned up. Next, the key/partition status is marked as unsuccessful. Any unprocessed data will be processed at a later time. Thus, the processing of data is discontinuous. There is a pause in the processing of data followed by a play at a later time.

In summary, the state machine is implemented such that states and their transitions are implemented to achieve visibility, graceful pause, partial replay and fidelity across replay. A typical data processing system might contain as many as 20 operators. If each operator has to implement this complex state machine, the implementation may become overwhelming and impractical. Thus, in one embodiment, the state machine operations are abstracted and accessed via an API. The operator implementation has no awareness of the state machine or its transitions. But, implementing the API guarantees that the operator is compatible with the state machine.

The following is a discussion of various methods that an operator needs to support so that the operator is executed in accordance with the state machine. The API and its implementation is the building block for a system that is flexible and ready to adapt itself to the vagaries of a loosely coupled distributed system.

Any data processing engine works by pipe-lining a sequence of operators. Each operator does some logical (algebraic computation) work to contribute to the answer to the user query. In conventional systems, Operator foo asks for data from Operator bar. Operator bar waits until Operator foo returns data. In the case of serial programs located in the same memory space, foo and bar have prior contracts on which memory locations will be used for doing the data transfer. 'foo' calls 'bar' and returns with an answer. With the invention, once initiated, operators work in their own domain and fill up an intermediate area with data. In the case of a cluster of machines, once an operator starts on a certain machine node (as a thread or a process), it remains at that location for the life of the operator. It works on preset partitions of data and fills up the intermediate area. The operator that produces the data is called the producer and the operator that consumes the data is called consumer.

Another generic operation in the parallel world is to create clones of the operator. Each clone does the same operation but on a different part of the data. Clones can be distinguished from each other by their physical manifestation (i.e., process ID or thread ID). Another identity function is the portion of the data that a particular clone is working on. An operator clone may start off working on a certain set of keys, but might change its key range if the system decides that the operator is either overwhelmed or underwhelmed. In a distributed system, an operator clone may start off working on Machine N1, migrate to N2 and end up at some machine N6. Location change is an important part of utilizing the cluster as a whole. The location is dictated by the partition of data on which the clone is working.

The following is an exemplary list of generic APIs that are the starting point for a pause and play API.

| Partition Based Iteration | PartitionOpen( ) |
| | PartitionKeyNext( ) |
| | PartitionClose( ) |
| Key Based iteration | KeyOpen( ) |
| | KeyValueNext( ) |
| | KeyClose( ) |
| Batch Based Iteration | BatchOpen( ) |
| | BatchPartitionNext( ) |
| | BatchClose( ) |

Each operator gets input data in batches. The source of this batch of data is either another operator or customer data pushed into the system. A sample Java implementation of an operator interface for processing batches is shown below:
public interface JdQueryBatch {
public void openBatch(String volName, String batchName, JdStateBatch stateSaver, JdQueryConfig config)
throws IOException, SLAViolation;
public void nextPartitionlint partitionId)
throws lOException. SLAViolation;
public void closeBatch() thrown IOException, SLAViolation; }
The JdStateBatch interface above is used by the operator to save any state pertaining to the current batch run and to retrieve any state pertaining to previous runs of this batch. The JdQueryConfig object permits access to configuration data that the operator needs to operate on its persistent data.

In one embodiment, operators do their work through clones. Copies of logical operators are instantiated as clones on any compute resource in a distributed system. Incoming data is partitioned by predefined attributes of each tuple. The clones are mapped to work on a specific partition of data. Each clone executes the same logical algorithm on a different partition of data. Clones and partitions are very similar to a conventional data processing operator. The conventional operator API is enhanced in pause and play with additional state saving parameters passed to the operator. A sample Java implementation of an operator interface for processing partitions is shown below.
public interface JdQueryPartition {
public void openPartition(String volName, int partitionId, Scring batchName, JdStatePartition stateSaver, JdQueryConfig config)
throws IOException, SLAViolation;
public void nextKey(String key)
throws IOException, SLAViolation;
public void closePartition()
throws IOException, SLAViolation;
}
Here, the JdStatePartition object provides interfaces to save and retrieve intermediate partition state that is used in case this operator gets re-played. Additionally, when the operator gets re-incarnated the following function gets invoked on the operator.
public enum PartitionStateEnum {
PART_OPEN,
PART_NEXT,
PART_CLOSE,
PART_RESTART,
PART_DONE;
}
/*
* This partition is being restarted. The previous partition
* failure happened in the state given in loggedState.
* Return the state that the partition is in—PART_OPEN and
* PART_DONE are legal return states.
*/
public PartitionStateEnum restartPartition(String volName, int partitionId, String batchName, JdStatePartition stateSaver,
PartitionStateEnum loggedState, JdQueryConfig config)
throws IOException;
Operators need to implement the API functions above. Operators that do implement this API get the benefit of running within a framework where they can be monitored for problems and restarted as necessary.

In the table below, we show the framework code that implements the call to PartitionOpen. This code snippet is responsible for handling calls to PartitionRestart if this happens to be a re-run of the job on a particular partition. The code snippet is also responsible for calling PartitionOpen, both with and without saved restart state.
JdQueryPartition jp=null;
OperatorAPIPartitionState restartState=null;
restartState=getRestartStatetbatchName, partitionId);
/*
* Check if restart state indicates that we are done handling this
* partition.
*/
PartitionStateEnum loggedState=null;
if (restartState !=null) {
loggedState=restartState.getState(batchName);

```
if (loggedState==PartitionStateEnum.PART_DONE) {
partitionIsDone=true;
return;
}
}catch (Exception e) {
throw now RuntimeException(e); }}
jp=getPartitionClassInstancelconfig);
if (jp==null) {
return;
}
if (loggedState !=null) {
/*
* This is a restart of a previous call. Let the operator know.
```

When multiple keys within a partition are targeted by a query, the framework iterates over these input keys and invokes operator-specific KeyOpen( ) and KeyClose( ) functions with each key. If multiple values are specified with each key, then the KeyValueNext( ) interface on the operator is invoked for each of these values. Both the operator interface and the framework implementation for per-key iteration are similar to the corresponding per-partition sections specified above.

Key selection is also important for the compute location of an operator's clones. The key is used to map to a partition via a distributed index defined on the key. The partitions of data are moved periodically to load balance the system. The Clones are moved along with the data. Movement of live operators (i.e., clones) with the data—without stopping the query—is an innovative feature associated with an aspect of the invention.

A clone of an operator is defined by the partition of data that it is processing. Clones should not be confused with threads. Even though a clone is executed as a separate thread on some node, the clone's defining property is not really the thread. In its lifetime, a clone could move across many nodes. This movement means that there is no 1-to-1 mapping between a thread and a clone.

An operator's data is partitioned across the cluster using some data boundaries. These boundaries are not permanent. A partition could merge with a neighboring partition or might get sub-divided into multiple partitions. This could lead to migration of a partition of data from one machine to another machine in the cluster. Clones of an operator are tied to partitions of data using the key identity. In conventional systems, operators assume that their data is available on a static location throughout their lifetime. With the invention, intermediate data access is through partition location methods. With these methods, an operator's code does not make an assumption about the location of intermediate data.
public int GetParticionFromKey(
String key) throws IOException;
public String MapPartitionToLocation(
int PartitionId) throws IOException;

With the APIs shown above, an operator implementation has flexibility to repair itself, relocate or restart at anytime. The operators work with a lightweight state. This state enables operator clones to migrate at any point in their lifetime. This migration is important as operator clones adopt to any data characteristics. If and when the data distribution changes, each operator clone has the capability to reinstall the state on a new node when it is migrated from one node to another.

Attention now returns to the SLA data analysis module 25, which processes SLA violations and issues control information to state machines associated with operators. At times, the SLA data analysis module 25 is referred to herein as a controller.

Figure 9:
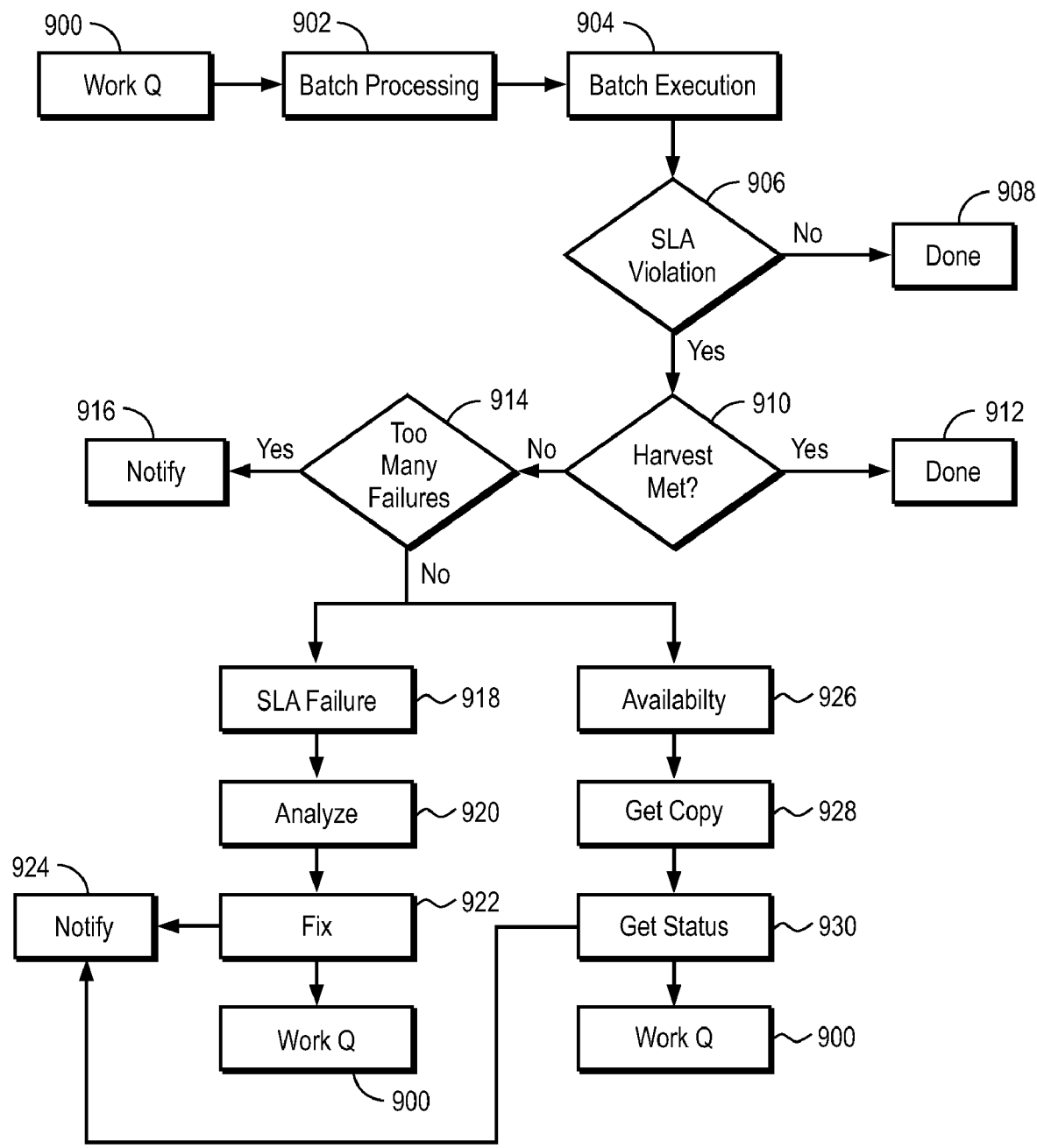
FIG. 9 illustrates controller operations utilized in accordance with an embodiment of the invention.

Referring to FIG. 9, a work queue 900 is submitted for batch processing 902. An individual batch is executed 904. If there are no SLA violations (906—No), then processing is done 908. If there are SLA violations (906—Yes), then it is determined whether a harvest or yield threshold is met 910. If so, processing is done 912. If not, the repetition count of SLA violations is compared to a threshold 914. If there are too many repetitions of a particular violation, notice is given 916. If there are an acceptable number of repetitions for SLA violations, then an SLA failure is isolated 918 and analyzed 920. A fix 922 is issued, notice is given 924, and the uncompleted work is returned to the work queue 900. In addition, data availability is analyzed 926. If necessary, a copy of the data 928 is secured. Data status is evaluated 930 and notice is given 924. The incomplete work is then placed in the work queue 900.

If violations prevent meeting a harvest requirement, an attempt is made to change the properties of the underlying data in order to meet SLAs on a subsequent operator run. This modification of properties is based on a detailed analysis of the violation that occurred. The data used for analysis may include clock time, CPU cycles, I/O latency, throughput rates and data size analyses of both the data that is operated upon and the data that the operator brings with it. These statistics are preferably recorded at the granularity of partitions, keys and key values.

Figure 10:
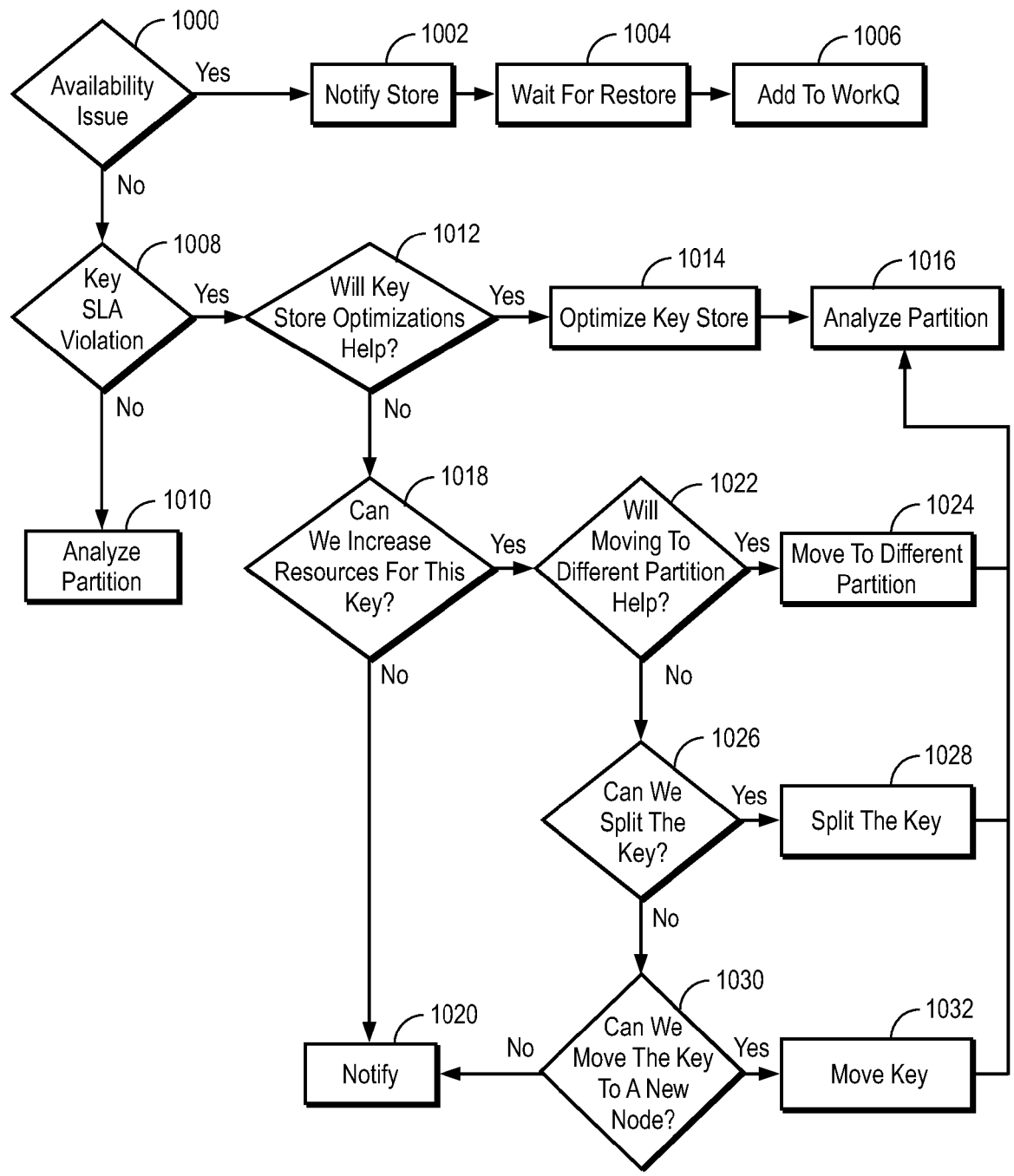
FIG. 10 illustrates controller analysis of key service level agreement violations processed in accordance with an embodiment of the invention.

FIG. 10 illustrates exemplary controller processing in the event of an SLA key violation. Key availability is assessed 1000. If a key is not available, a key store is notified 1002. The process then waits for the key to be restored 1004. The key is then added to a work queue 1006. If key availability is not an issue, it is determined whether there is a key SLA violation 1008. If not, then a partition is analyzed for a violation 1010. If there is a key SLA violation, it is determined whether a key store optimization would be helpful 1012. If so, the key store is optimized 1014 and processing proceeds to partition analysis 1016. If a key store optimization will not help, then it is determined whether resources for the key should be increased 1018. If so, it is determined whether to move the key to a different partition 1022. If this will be efficient, the key is moved to a different partition 1024. Otherwise, a decision is made whether to split the key 1026. If it is efficient to do so, the key is split 1028. Otherwise, it is determined whether the key should be moved to a different node 1030. If the key should be moved to a new node, the key is moved 1032. Otherwise, an administrator is notified of key failure 1020.

Figure 11:
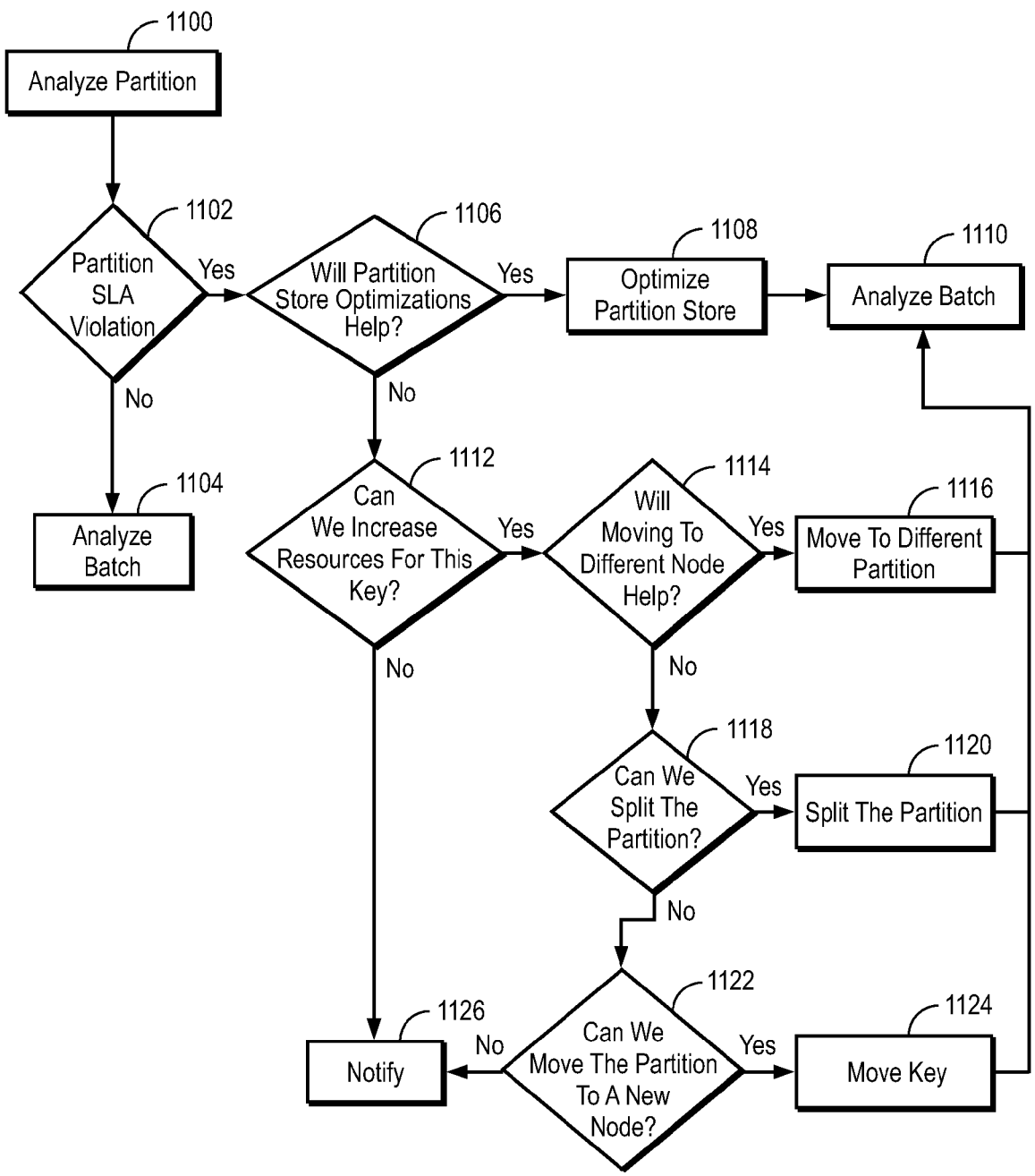
FIG. 11 illustrates controller analysis of partition service level agreement violations processed in accordance with an embodiment of the invention.

The analysis of SLA partition failures may be implemented in a similar manner, as shown in FIG. 11. A partition is analyzed 110. If there is no partition SLA violation (1102—No), then a batch is analyzed 1104. Otherwise, it is determined if a partition store optimization would be helpful 1106. If so, the partition store is optimized 1108 and then a batch is analyzed 1110. If a partition store optimization will not be helpful, then it is determined whether an increase in partition resources would be helpful 1112. If so, movement to a different partition is considered 1114. If this would be helpful, the key is moved to a different partition 1116. Otherwise, a partition split is considered 1118. If this would be helpful, the partition is split 1120. Otherwise, a new node is considered 1122. If this would be helpful, then the key is moved to a new node 1124. If the foregoing resource considerations will not solve the problem, then an administrator is notified 1126.

Figure 12:
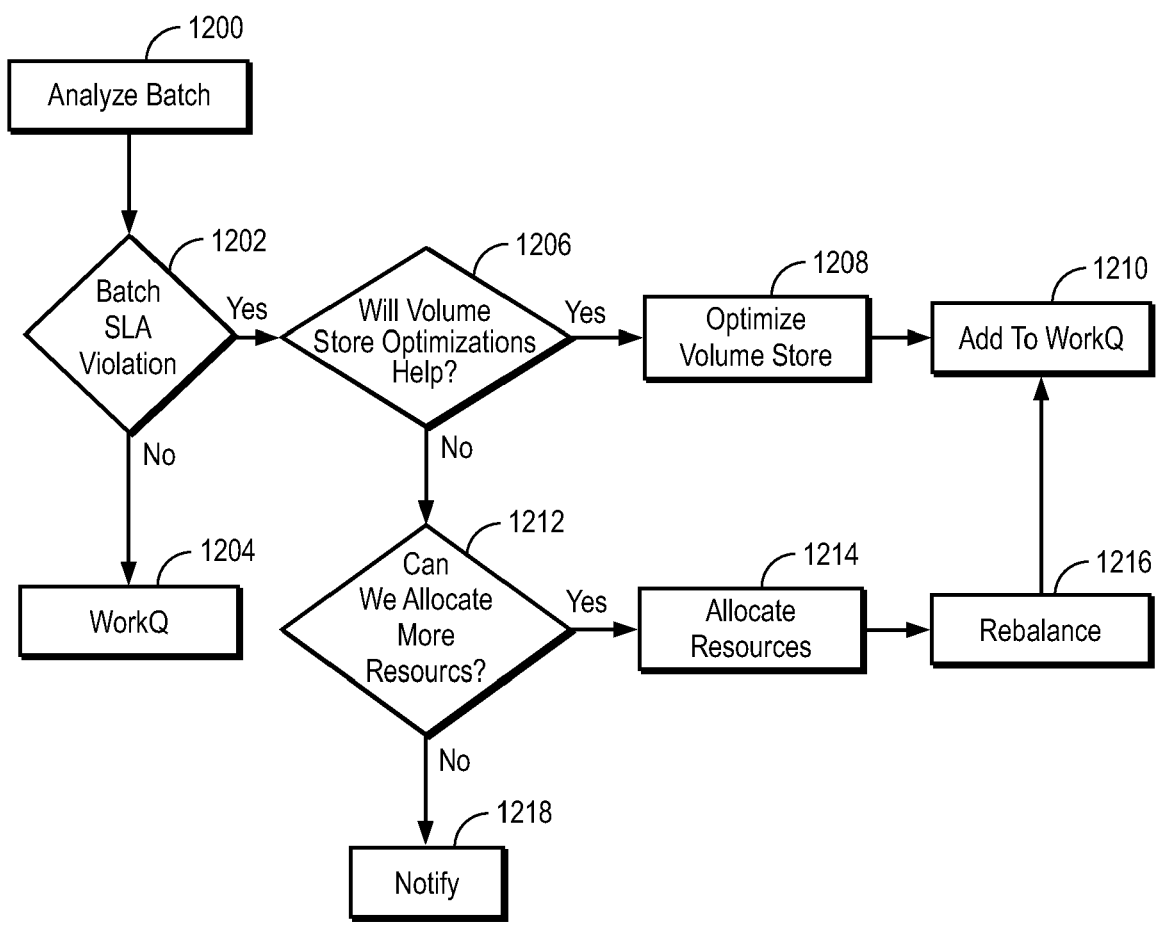
FIG. 12 illustrates controller analysis of batch service level agreement violations processed in accordance with an embodiment of the invention.

Batch SLA failures may also be analyzed by the SLA data analysis module 25, as shown in FIG. 12. A batch is analyzed 1200. If there is no batch SLA violation (1202—No), then control is returned to the work queue 1204. Otherwise, a volume store optimization is considered 1206. If a volume store optimization would be helpful, then the volume store is optimized 1208 and the batch is added to the work queue 1210. If a volume store optimization will not be helpful, additional resources are considered 1212. If additional resources will be helpful, additional resources are allocated 1214 and work is rebalanced 1216. Otherwise, an administrator is notified 1218.

As discussed in connection with FIG. 2, protocols 26 of the invention implement operations specified by the SLA data analysis module 25. Before discussing protocols of the invention, please consider the following terms. A key processing flood occurs when processing on a single key is overwhelmed by either the amount of data in the key or the characteristics of the data in the key. Similarly, a partition processing flood occurs when processing on a single partition is overwhelmed by either the amount of data in the partition or the characteristics of the data in the partition. An embodiment of the invention utilizes the following mechanisms to implement the following protocols.

Key processing flood restart occurs as a result of action taken by the system when a key processing flood is detected. The system detects this state as an SLA violation and pauses processing of the key. After taking repair actions, the system restarts key processing. Key processing flood repair also occurs as a result of action taken by the system when a key processing flood is detected. The job is paused and the system carries out automatic repair actions based on the SLA violation that occurred. Data stored with the key can be restructured to handle future queries better, the data can be split up into multiple storage and processing silos or other such actions can be taken.

Key processing flood relocation occurs as a result of action taken by the system when a key processing flood is detected. The job is paused and the system decides whether to relocate the key to a node with different characteristics, such as a node with better compute or input/output capabilities.

Partition processing flood restart occurs as a result of action taken by the system when a partition processing flood is detected. The system detects this as an SLA violation and pauses processing of the partition. After taking repair actions, the system restarts partition processing.

Partition processing flood key repair occurs as a result of action taken by the system when a partition processing flood is detected. The job is paused and the system carries out automatic repair actions based on the SLA violation that occurred. Data stored with the partition can be restructured to handle future queries better. For example, the data can be split up into multiple storage and processing silos.

Partition processing flood relocation occurs as a result of action taken by the system when a partition processing flood is detected. The job is paused. The system may decide to relocate the partition with different characteristics, such as better compute or 10 capabilities.

The invention allows operators to easily pause and restart from the point they left off with the resolution of up to a single key. Operators may also store their own restart state to get even finer restart control. There are a number of benefits associated with this adaptability. Instead of relying on stale statistics collected many hours ago, the system uses real-time data to make better inline decisions during runtime. When decisions are made about keys or partitions being overused, these decisions are based on real runtime data, not on imprecise statistics. This means that any adjustments made during query run are much more likely to help. If there is a single overburdened key or partition, one can isolate and repair or improve the performance of the problem data. This means that any impact on query performance can be limited to the problem key or partition alone. Advantageously, repair operations only impact a small amount of data and can be targeted precisely. If the query that has some paused components is part of a larger query workflow, then downstream queries can start processing the data that has been produced already. Depending on how long downstream queries take, there may not be any overall slowdown in the eventual user response. Installations can start very small and grow as needed to use more compute and storage resources. This helps installations to be need-based and adjust as opposed to the current situation where installation sizes are planned based on forecasts that are very hard to get right. Bursts in query traffic can be handled by adapting the system to the new traffic pattern. A later reduction in the volume or resource needs of queries will make the system adapt by reducing the number of resources available to it. All of this helps system cost by only using resources as necessary.

SLA violations may be characterized in three broad categories: availability SLAs, absolute SLAs and relative SLAs. Availability SLAs relate to a scenario where part of the input data or working data is not available because of hardware component failures or software failures that impact parts of the data store. Absolute SLAs relate to the fact that every key, partition, and batch is given a maximum amount of time to run. Each of these objects is also given a maximum in terms of other resources, such as disk storage used. Any violation is reported. Relative SLAs define a threshold multiplier that specifies the maximum differential permitted between the processing time of a specific object and the average processing time for all objects of that type. This helps keep track of less-than-optimal resource distribution even when all resources are meeting their absolute SLA requirements. This in turn helps the system optimize these resources early, before any problems show up.

For availability SLAs, the repair operation is fairly simple—notify the analysis module 125 that the data is no longer available and wait for recovery attempts to complete. For absolute and relative SLA violations, possible repair operations are more complicated to undertake. If a relatively small percentage of objects is seeing problems, then an analysis of the statistics reported by all objects may find that relocating these objects to parts of the system that are underutilized may help. If a large percentage of objects is seeing problems, then this is indicative of a modification to the input data or to the kind of queries being run that can only be improved by the addition of new resources to the system followed by the redistribution of existing objects across the newly available set of resources. The system has access to some reserve nodes that can be deployed in this situation. If this is not sufficient to handle the new load, then administrative intervention may be required to substantially increase the provisioning of resources to the system.

The following operations characterize the execution of a batch where there are no reported SLA violations. This details the normal execution path and sets the stage for later descriptions of execution paths where problems are detected and corrected.

Job Startup
1. Data Loader loads input data into the work queue as a batch
2. The work scheduler picks up the next ready work item from the work queue and hands it to the batch processor Batch Processing
3. Batch processor picks up batch data for processing
4. Batch processor iterates over each partition with the following algorithm:
    1. Look for retry state for the partition. Since this is the first run for this batch, we will not find any retry state and will proceed
    2. Look for batch-level SLA violations. Let's assume that no batch-level SLA violations are found 3. Find the compute location for the partition we are operating on
4. If a task for the partition can be scheduled at the compute location, then schedule that task and open the partition. Otherwise, retry from the SLA violation check onwards when a task becomes available
5. The partition iteration process is repeated for every partition in the system Partition Processing As each partition is scheduled, it goes through the following stages. In the steps below, the partition being worked on is referred to as '$P_x$', and the key being worked on in the partition is referred to as '$P_xK_y$'.

6. $P_x$ looks for partition-level restart state and does not find any.

Key Processing

7. $P_x$ iterates over keys in the partition. For each key $K_y$:
   1. $P_x$ looks for partition-level SLA violations. $P_x$ does not find any violations.
   2. $P_xK_y$ looks for key-level restart state and does not find any
   3. For each value within the key being processed, $P_xK_y$ goes through the following process:
      1. $P_xK_y$ looks for key-level SLA violations
      2. $P_xK_y$ does not find any violations, and opens the next value
      3. $P_xK_y$ processes the value, updating the store as necessary
   4. When all key values have been processed
      1. $P_xK_y$ saves away restart state
      2. $P_xK_y$ commits all changes
      3. $P_xK_y$ returns success to $P_x$
8. $P_x$ repeats step 7 for all other keys, possibly in parallel
9. Eventually, $P_x$ has no more keys to process Partition Post-Processing 10. $P_x$ saves away restart state
11. $P_x$ closes itself and reports success to the batch processor Batch Post-Processing Eventually, the batch processor gets back success reports from all partitions.

12. Batch processor reports success
13. Batch processor deletes all restart state for the batch Key Flood Restart, Repair & Relocation—in this scenario, a detailed look at the flow of the system is considered in the event that a single key sees an SLA violation. Only those parts of the workflow that are different than the common case are listed.

Key Processing

1. $P_x$ iterates over keys in the partition. For each key $K_y$:
   1. $P_x$ looks for partition-level SLA violations. $P_x$ does not find any violations.
   2. $P_xK_y$ looks for key-level restart state and does not find any
   3. $P_xK_y$ looks for key-level SLA violations.
   4. At this point, we are presenting a problematic key $P_1K_1$ which has a set of values in it that take a long time to process. The flow for this key is as follows
      1. $P_1K_1$ does not find any SLA violations, and opens value $P_1K_1v1$
      2. $P_1K_1v_1$ get processed. For some reason, this takes a long time.
      3. $P_1K_1$ looks for SLA violations and finds a violation of the max-time SLA
      4. $P_1K_1$ saves away restart state
      5. $P_1K_1$ commits all changes made so far
      6. $P_1K_1$ returns success-with-violations to $P_1$
         1. Note that all values in $P_1K_1$ except for the first one have not been processed.
            The query operator is said to be in a paused state.
   2. $P_x$ repeats steps 7 through 9 for all other keys, possibly in parallel. In this scenario, we are going to assume that no other keys except for $P_1K_1$ report SLA violations.
   3. $P_1$ has no more keys to process Partition Post-Processing 4. $P_x$ saves away restart state
5. $P_1$ closes itself and reports success-with-violations to the batch processor. All other partitions close and report success.

Batch Post-Processing

Eventually, the batch processor gets back success reports from all partitions except P1.

6. Batch processes looks for SLA violations and finds one.
7. Every batch gets a fixed number of attempts. The batch processor checks for whether the retry attempts for this batch have been exhausted. If so, it notifies the administrator and exits.
8. The batch processor identifies the SLA violation as a per-key violation
9. If this is an availability violation, then notify the data store and wait for the store to restore this data. Once the data has been restored, re-queue the batch into the work queue and exit.
10. Look at local statistics for the key to see if any local optimizations to the data store can be made. If local optimizations can be made, then schedule them, re-queue the batch into the work queue and exit.
11. Look at resource contention statistics for this key, and see if it can be relocated. If yes, then relocate the resource via store interfaces, re-queue the batch into the work queue and exit.

Batch Retry

In the cases where the batch has been re-queued into the work queue:

12. The work scheduler picks up this job from the work queue and starts processing it.

Partition Retry

13. $P_1$ looks for partition-level restart state and finds states indicating that only key $P_1K_1$ should be processed.
14. $P_1$ looks for partition-level SLA violation. $P_1$ does not find any violations, and opens Key $P_1K_1$
15. $P_1K_1$ looks for key-level restart state and finds that $P_1K_1v_1$ has already been processed. All other values go through normal processing
16. $P_1K_1$ returns success to $P_1$
17. Since $P_1K_1$ is the only key within $P_1$ that is being processed, $P_1$ has no more keys to process
18. $P_1$ saves away restart state
19. $P_1$ closes itself and reports success to the batch processor
20. Batch processor reports success
21. Batch processor deletes all restart state for the batch Partition Flood Restart, Repair and Relocation—in this scenario, we take a detailed look at the flow of the system when a single partition sees an SLA violation. We only enumerate those parts of the workflow that are different than the common case.

Job Startup

Partition Processing

As each partition is scheduled, it goes through the following stages. In the steps below, the partition being worked on is referred to as '$P_x$', and the key being worked on in the partition is referred to as '$P_xK_y$'.

1. $P_x$ looks for partition-level restart state and does not find any.
2. $P_x$ iterates over keys in the partition. For each key Ky:
    1. $P_x$ looks for partition-level SLA violations. In this scenario, partition $P_2$ finds a violation of the max-time SLA when it is halfway down its list of keys. This partition jumps to step 10 below. All other partitions find no SLA violations here.
    2. $P_xK_y$ looks for key-level restart state and does not find any Key Processing
3. For each value within the key being processed, PxKy goes through the following process:
    1. $P_xK_y$ looks for key-level SLA violations
    2. $P_xK_y$ does not find any violations, and opens the next value
    3. $P_xK_y$ processes the value, updating the store as necessary
4. When all key values have been processed
    1. $P_xK_y$ saves away restart state
    2. $P_xK_y$ commits all changes
    3. $P_xK_y$ returns success to $P_x$
3. $P_x$ repeats step 7 for all other keys, possibly in parallel.
4. Eventually, $P_x$ has no more keys to process Partition Post-Processing
5. $P_x$ saves away restart state.
6. $P_x$ closes itself and reports success to the batch processor. In this scenario, partition $P_2$ reports success-with-violations to the batch processor while all other partitions report success.

Batch Post-Processing
Eventually, the batch processor gets back success reports from all partitions except $P_x$.
7. Batch processes looks for SLA violations and finds one.
8. Every batch gets a fixed number of attempts. The batch processor checks for whether the retry attempts for this batch have been exhausted. If so, it notifies the administrator and exits.
9. The batch processor identifies the SLA violation as a per-partition violation. If this is an availability violation, then notify the data store and wait for the store to restore this data. Once the data has been restored, re-queue the batch into the work queue and exit.
10. Look at local statistics for the partition to see if any local optimizations to the data store can be made. If local optimizations can be made, then schedule them, re-queue the batch into the work queue and exit.
11. Look at resource contention statistics for this partition and see if it can be relocated. If yes, the relocate the resource via store interfaces, re-queue the batch into the work queue and exit.

Batch Retry
In the cases where the batch has been re-queued into the work queue: the work scheduler picks up this job from the work queue and starts processing it.

Partition Retry
12. $P_2$ looks for partition-level restart state and finds states indicating that a set of keys have already been processed. Only the keys that are not shown to be processed in the restart state are processed below.
13. $P_2$ iterates over non-processed keys in the partition. For each key Ky:
    1. $P_2$ looks for partition-level SLA violations. After the repair operations that were carried out, $P_2$ does not see any SLA violations in this stage.
    2. $P_2K_y$ looks for key-level restart state and does not find any Key Retry
Partition Post-Processing
14. $P_2$ saves away restart state.
15. $P_2$ closes itself and reports success to the batch processor Batch Post-Processing
16. Batch processor reports success
17. Batch processor deletes all restart state for the batch The general strategy of pausing operators on particular objects does not normally impact the concurrent usage of those objects by other batches that are being processed at the same time. The data store uses an online replication strategy that permits objects to change their physical locations without impacting object access.

When there is an availability issue for sections of the store, all future operators will also need to pause at similar places in their execution. The disclosed techniques of retrying the batches that don't meet harvest requirements a few times and reporting success on others with the appropriate reporting on harvest numbers works well. When considering a workflow of jobs that needs to be chained together, two different approaches may be used depending on the operators in question. In one approach, as batches execute and complete partially, data is published for operators down the chain to consume. If a batch needs to get retried, then as those retries publish new bits of data, that also will be passed down the line for antecedent operators to consume. This works well if the operators don't have any requirements of needing to get all the data at once. Other operators require a stricter chaining and execute only on success of the preceding operators in the workflow. In these cases, only after a batch has completed successfully is the following operator scheduled. These scheduling decisions are taken by the work scheduler based on the configured properties of the operators and the workflow.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium with executable instructions specifying the execution of a state machine operating across a plurality of computing nodes in a distributed computing system, comprising executable instructions to:
    execute a plurality of operators, wherein the execution of each operator is under the control of a state machine that checks for a violation of a service level agreement and invokes pause control states to pause the execution of an operator in response to the violation of the service level agreement specifying an operating condition threshold within the distributed computing system;
    form partitions of input data that are worked on independently within the distributed computing system;
    process a set of data batches associated with the input data;
    specify data partition control states to process the partitions associated with the set of data batches;
    define key control states to process a set of keys associated with a data partition of the partitions, and wherein the pause control states comprise a partition pause state or a key pause state.

2. The computer readable storage medium of claim 1 wherein the state machine stores execution state in response to a pause control state.

3. The computer readable storage medium of claim 2 wherein the execution state includes partition execution state and key execution state.

4. The computer readable storage medium of claim 2 wherein the state machine reinitiates execution of a paused operator by invoking the stored execution state.

5. The computer readable storage medium of claim 4 wherein the state machine reinitiates execution of the paused operator after redistribution of processing tasks on resources in the distributed computing system.

6. The computer readable storage medium of claim 1 wherein the pause control states include a batch service level agreement check state, a partition service level agreement check state and a key service level agreement check state.

7. The computer readable storage medium of claim 1 wherein the pause control states include a partition success check state and a key success check state.

8. The computer readable storage medium of claim 1 wherein the pause control states include a batch service level agreement check state, a partition service level agreement violation check state, a partition pause state, a key service level agreement violation state and a key pause state.

9. The computer readable storage medium of claim 1 wherein the pause control states include a partition replay status state and a key replay status state.

10. The computer readable storage medium of claim 1 wherein the pause control states include a partition cleanup state and a key cleanup state.

11. The computer readable storage medium of claim 1 wherein the state machine is invoked through method calls associated with an application program interface.

12. The computer readable storage medium of claim 11 wherein the application program interface includes method calls to open a data partition, invoke a key in a data partition and close a data partition.

13. The computer readable storage medium of claim 11 wherein the application program interface includes method calls to open a key, invoke a subsequent key value and close a key.

14. The computer readable storage medium of claim 11 wherein the application program interface includes method calls to open batch data, invoke a subsequent batch of data, and close batch data.

15. The computer readable storage medium of claim 11 wherein the application program interface passes data on service level agreement violations.

16. The computer readable storage medium of claim 11 wherein the application program interface passes data on input/output exceptions.

17. The computer readable storage medium of claim 1 wherein the state machine continuously checks for a violation of a service level agreement.

18. The computer readable storage medium of claim 1 wherein the state machine asynchronously checks for a violation of a service level agreement.

19. A computer readable storage medium with executable instructions specifying the execution of a state machine operating across a plurality of computing nodes in a distributed computing system, comprising executable instructions to:
    execute a plurality of operators, wherein the execution of each operator is under the control of a state machine that asynchronously checks for a violation of a service level agreement and invokes pause control states to pause the execution of an operator in response to the violation of the service level agreement specifying an operating condition threshold within the distributed computing system;
    form partitions of input data that are worked on independently within the distributed computing system;
    process a set of data batches associated with the input data;
    specify data partition control states to process the partitions associated with the set of data batches;
    define key control states to process a set of keys associated with a data partition of the partitions; and wherein the pause control states comprise a partition pause state and a key pause state.

20. A computer readable storage medium with executable instructions specifying the execution of a state machine operating across a plurality of computing nodes in a distributed computing system, comprising executable instructions to:
    execute a plurality of operators, wherein the execution of each operator is under the control of a state machine that asynchronously checks for a violation of a service level agreement and invokes pause control states to pause the execution of an operator in response to the violation of the service level agreement specifying an operating condition threshold within the distributed computing system;
    form partitions of input data that are worked on independently within the distributed computing system;
    process a set of data batches associated with the input data;
    specify data partition control states to process the partitions associated with the set of data batches;
    define key control states to process a set of keys associated with a data partition of the partitions; and wherein the pause control states include a batch service level agreement check state, a partition service level agreement violation check state, a partition pause state, a key service level agreement violation state and a key pause state.

* * * * *